Oct. 23, 1962 A. M. FEILER ET AL 3,059,590
HIGH-LINE TRANSFER SYSTEM
Filed Nov. 16, 1960 8 Sheets-Sheet 1

INVENTORS
ALFRED M. FEILER
GORDON S. LIGHT
BY

ATTORNEY

Oct. 23, 1962  A. M. FEILER ET AL  3,059,590
HIGH-LINE TRANSFER SYSTEM
Filed Nov. 16, 1960  8 Sheets-Sheet 2

INVENTORS
ALFRED M. FEILER
GORDON S. LIGHT
BY
ATTORNEY

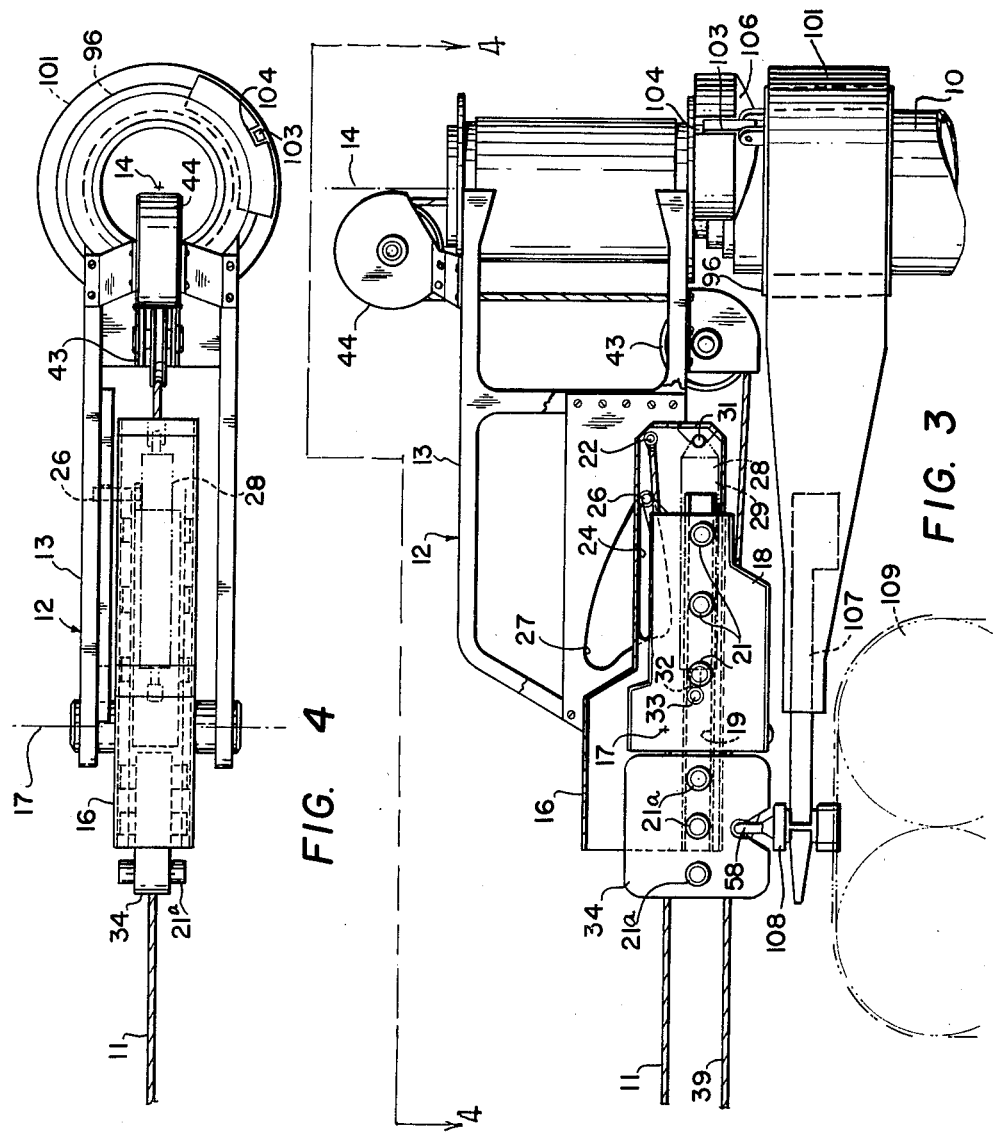

Oct. 23, 1962     A. M. FEILER ET AL     3,059,590
HIGH-LINE TRANSFER SYSTEM
Filed Nov. 16, 1960     8 Sheets-Sheet 4

INVENTORS
ALFRED M. FEILER
BY GORDON S. LIGHT

ATTORNEY

Oct. 23, 1962     A. M. FEILER ET AL     3,059,590

HIGH-LINE TRANSFER SYSTEM

Filed Nov. 16, 1960     8 Sheets-Sheet 5

INVENTORS
ALFRED M. FEILER
BY GORDON S. LIGHT

ATTORNEY

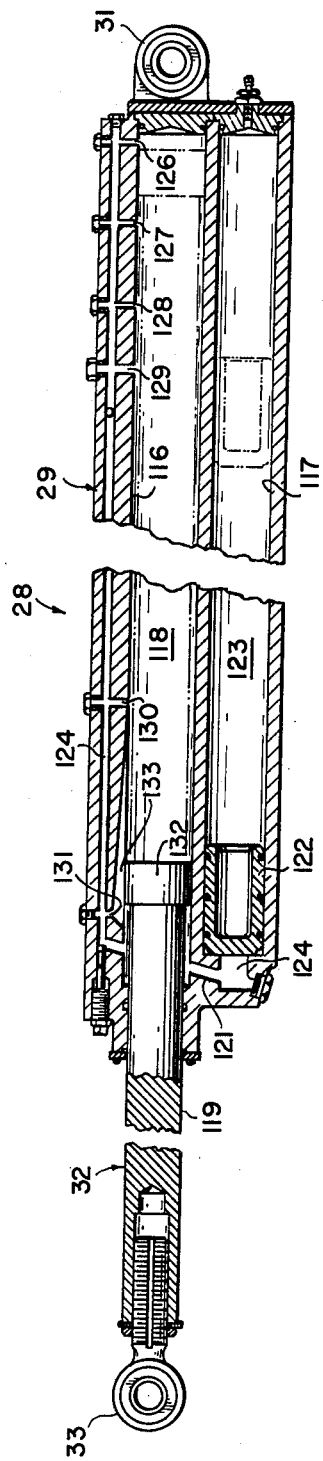

Oct. 23, 1962 A. M. FEILER ET AL 3,059,590
HIGH-LINE TRANSFER SYSTEM
Filed Nov. 16, 1960 8 Sheets-Sheet 8
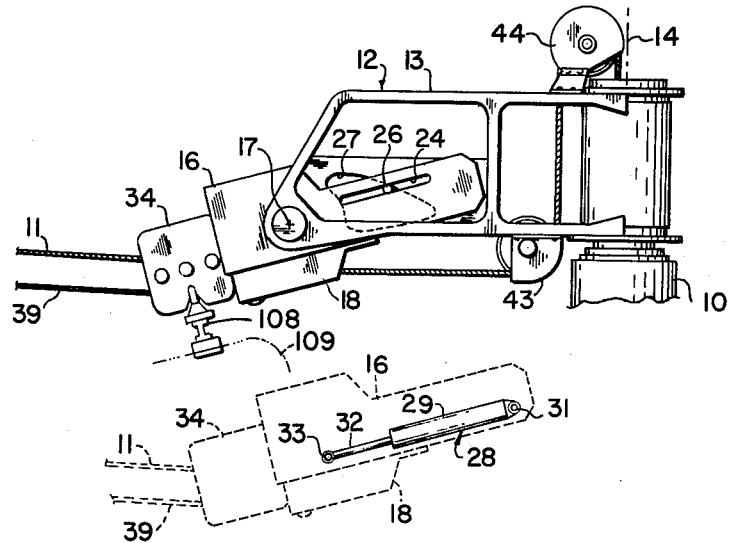
FIG. 9c
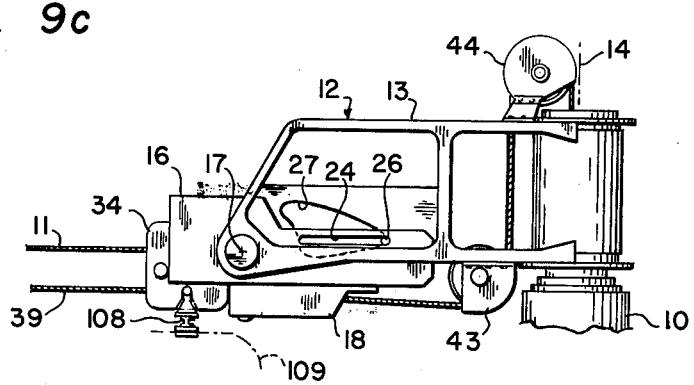
FIG. 9d
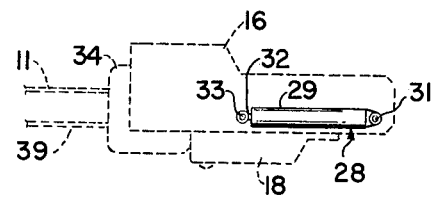
INVENTORS
ALFRED M. FEILER
BY GORDON S. LIGHT
ATTORNEY _United States Patent Office_  3,059,590
Patented Oct. 23, 1962

3,059,590
HIGH-LINE TRANSFER SYSTEM
Alfred M. Feiler, Palisades, Calif., and Gordon S. Light, Chevy Chase, Md., assignors to PneumoDynamics Corporation, Cleveland, Ohio, a corporation of Delaware
Filed Nov. 16, 1960, Ser. No. 69,665
16 Claims. (Cl. 104—114)

This invention relates generally to high-line transfer systems and more particularly to a high-line system suitable for use in transferring supplies or armament between two vessels underway at sea.

The transfer of supplies and armament between vessels at sea is difficult and dangerous since it requires the two vessels to operate relatively close together. It is therefore essential that the transfer system be adapted for rapid operation to complete any necessary transfers in a minimum period of time. It is also necessary to provide a transfer system wherein the supplies being transferred are accurately controlled to prevent their swinging in a hazardous manner.

A high-line transfer system, incorporating this invention, is capable of rapid operation to minimize the time necessary to complete a given transfer operation and is arranged to maintain complete control of the supplies being transferred. The system is also arranged so that the entire transfer operation is mechanized and powered to eliminate all manual operations.

It is an important object of this invention to provide a high-line transfer system which can be operated under adverse conditions to rapidly transfer loads wherein all of the operational steps required for the transfer are fully mechanized.

It is another important object of this invention to provide a high-line transfer system suitable for use between two vessels operating at sea wherein the load is completely controlled at all times.

It is another important object of this invention to provide a ship board high-line transfer system which automatically compensates for changes in relative position of the vessels during the transfer operation.

It is still another object of this invention to provide a ship board high-line transfer system wherein the transferred load is locked into a predetermined position relative to the receiving head at the end of the transfer movement so that it can be rapidly and easily secured by the ship board load handling equipment.

It is still another object of this invention to provide a high-line transfer system wherein the receiving head assembly is automatically oriented by the high-line to adjust for movement in the relative position of the vessels in combination with a mechanism for capturing the load when it reaches the end of its transfer travel.

It is still another object of this invention to provide a high-line transfer system with damping means to prevent damage to the transferred load.

Further objects and advantages will appear from the following description and drawings wherein:

FIGURE 3 is a view similar to FIGURE 2 with the trolley in the captured position;

FIGURE 4 is a plan view taken along line 4—4 of FIGURE 3;

FIGURE 8 is a longitudinal section of the hydraulic damper and spring mechanism which decelerates the load as it approaches the captured position; and FIGURES 9a through 9d are schematic illustrations of the operations of the receiving head assembly as the trolley approaches the captured position.

Figure 1:
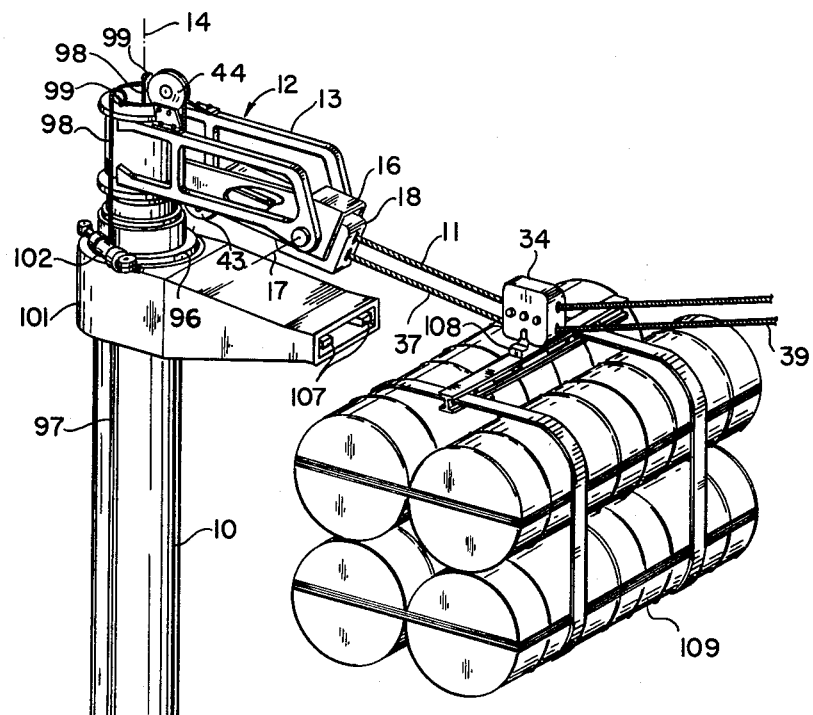
FIGURE 1 is a perspective view of the receiving head assembly and its support mast illustrating the operation of a preferred form of a high-line transfer system incorporating this invention.

In order to transfer a load from one vessel to another by a high-line transfer system, it is necessary to raise the load and secure it to the trolley which moves back and forth between the vessels along the high-line. For this purpose an elevator is provided which is automatically positioned relative to the trolley when the trolley is in the load receiving or captured position. Once the load is connected to the trolley, the elevator is moved and the trolley is pulled out along the high-line toward the receiving vessel. While this operation is taking place, the elevator picks up the next load. Insofar as possible, the operations are performed simultaneously to reduce the time required to complete a given transfer operation.

The receiving head assembly at each end of the high-line is provided with a swivel structure so that the receiving heads are directly in line with the high-line even though the two vessels may move relative to each other during the transfer operation. When the trolley reaches the receiving ship, it is automatically positioned in a predetermined manner in the receiving head of the receiving ship. The elevator on the receiving ship is also automatically oriented relative to the trolley so that the load can be engaged and secured in the elevator quickly. As soon as the elevator of the receiving ship engages the load, the load is released from the trolley and lowered to the load handling equipment used to transport the load to its required location. While this is going on, the trolley is returning to the supply ship to pick up a subsequent load for transfer.

Throughout all of the operations, the loading transfer is fully controlled and is restrained against swinging movement which could damage the load or injure the ship or personnel. Because of the accurate and continuous control of the load, it is possible to operate a transfer system incorporating this invention even during adverse conditions of war time or of high seas. Damping means are provided to decelerate the trolley and load when it reaches the end of its transfer travel so that the load will not be subjected to damaging deceleration forces. For this reason relatively fragile loads can be transferred without fear of damage.

One preferred form of this invention is illustrated in the drawings wherein a mast or frame 10 is mounted in any suitable location on each of the vessels. A high-line 11 extends between the two masts and the high-line is connected to an automatic tensioning device which maintains a predetermined tension in the high-line while providing means to compensate for variations and distances between the vessels. Such tensioning devices are known to those skilled in the art and may include a heavy weight which is vertically movable to permit the high-line to extend as the ships move apart or to take up cable as the ships move together while still maintaining the predetermining tension in the high-line cable. In normal practice the high-line is anchored by a fixed connection at one end and the cable tensioning system is provided at the other end, usually on the supply vessel.

Mounted at the upper end of the mast is a receiving head assembly 12 which includes a receiving head proper 13 journaled on the upper end of the mast 10 for rotation about the central vertical axis 14 of the mast. A cradle 16 is pivotally mounted on the receiving head 13 for rotation about a pivot axis 17 which extends laterally of the receiving head 13. A carriage 18 is mounted for linear movement between an extended position illustrated in FIGURE 2 and a retracted position illustrated in FIGURE 3. To support the carriage within the cradle, the cradle is provided with opposed tracks or guides 19 along which rollers 21 on the carriage moves. The high-line 11 is anchored on the rearward end of the cradle 16 by an anchor pin 22 and extends between guide rollers 23 mounted on the forward end of the carriage 18. It should be understood that only one end of the high-line would be anchored directly on the cradle, and that the other end would be connected to a tensioning device discussed above.

The anchor pin 22 and the guide roller 23 are located so that the high-line 11 extends through the pivot axis 17, and so that the guide rollers 23 are outboard of the pivot axis 17. This structure insures that the carriage 18 and cradle 16 are rotated about the pivot axis 17 to a position wherein the carriage 18 and cradle 16 extend in the direction of the high-line 11. In other words, the high-line 11 automatically operates to orient the carriage 18 and cradle 16 in a direction which extends along the high-line 11. This same action causes the rotation of the entire receiving head assembly 12 around the axis 14 so that the receiving head assembly is always positioned in alignment with the high-line 11 regardless of the relative movement between the two vessels.

The cradle 16 is formed with a longitudinally extending slot 24 through which extends a laterally extending pin 26 mounted on the rearward end of the carriage 18. The pin 26 serves to limit the longitudinal movement of the carriage 18 relative to the cradle 16 by engaging the left of the slot 24 when the carriage is in an extended position and the right end of the slot 24 when the carriage is in the retracted position. The pin 26 also extends laterally beyond the side walls of the cradle 16 for engagement with a positioning cam 27 mounted on the receiving head proper 13. As the carriage 18 moves toward the retracted position of FIGURE 3, the pin 26 engages the walls of the cam 27 and rocks the cradle 16 and carriage 18 to a predetermined horizontal position relative to the receiving head 13 and operates to lock the cradle 16 against rotation around the axis 17.

A spring and shock absorbing unit 28 includes a cylinder 29 pivoted at 31 on the cradle 16 and a piston 32 pivotally connected to the carriage 18 at 33. The spring 28 functions to urge the carriage 18 toward the forward position of FIGURE 3 and provide damping to resist movement of the carriage toward the retracted position. The physical structure of the shock absorber 28 is illustrated in FIGURE 8 and will be discussed in detail below.

A trolley 34 is supported on the high-line 11 for movement between the vessels by rollers 36 (see FIGURE 5a) which engage the upper side of the high-line 11. An inhaul line 37 is connected to the trolley at 38 and outhaul line 39 is connected to the trolley at 41. Referring again to FIGURE 2, the inhaul line 37 extends through a guide roller 42 on the carriage 18 and from there around pulley wheels 43 and 44 on the receiving head 13. From the pulley 44 the inhaul line 37 passes down through the mast 10 to a suitable winch used to haul the trolley and its connected loads into the receiving head. The outhaul line 39 passes through the similar structure on the other vessel to a winch located on that vessel to move the trolley in the outward direction. Normally, the winches connected to the inhaul line 37 and the outhaul line 39 should be arranged to provide a predetermined drag when they are playing out line so that the lines 37 and 39 will not drag in the water and to provide stabilizing control for the trolley 34.

The trolley 34 is provided with a plurality of guide rollers 21a which extend beyond its side walls for engagement with the tracks 19 on the cradle 16 as the trolley moves to the captured position in FIGURE 3. Thus, when the trolley 34 is in a captured position, it is supported by the tracks 19 in the cradle 16 and not by the high-line 11. Thus the trolley 34 is supported in a predetermine position relative to the cradle 16 and as a result is positioned in a predetermined position relative to the entire receiving head assembly 12. As the trolley 34 approaches the captured position, it engages the end of the carriage 18 and causes the carriage to move to the right as viewed in FIGURE 2 against the action of the spring 28 until the elements assume the captured position of FIGURE 3. The spring 28 through the action of its damper decelerates the trolley 34 in a controlled manner so that it will be brought to rest in the captured position. The action of the trolley 34 in moving the carriage 18 to the right also functions through the pin 26 and its engagement with the cam 27 to move the cradle 16 to the horizontal position of FIGURE 3. Thus the entire assembly is locked in a position at right angles to the mast 10 when the trolley comes to rest in the captured position.

The cam 27 is shaped so that it will function to bring the cradle to the predetermined horizontal position regardless of the initial cradle position. The entire receiving head assembly, however, is still free to swivel about the vertical axis 14.

Figure 7:
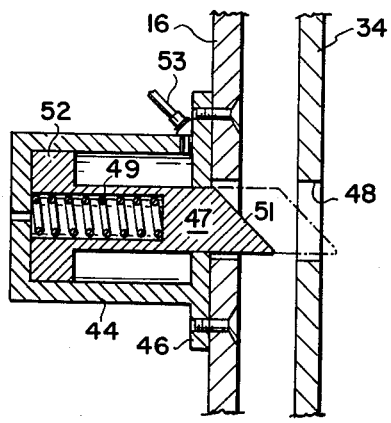
FIGURE 7 is an enlarged fragmentary section of the latching actuator used to releasably secure the trolley in the captured position.

In order to lock the trolley 34 in the captured position, a latch mechanism illustrated in FIGURE 7 is utilized. The latch mechanism includes a cylinder 44 formed with a flange 46 bolted to the side plate of the cradle 16. A latch member 47 extends through an aperture in the side wall of the cradle 16 and is adapted when in the forward or phantom position of FIGURE 7 to extend into an aperture 48 formed in the side wall of the trolley 34. A spring 49 extends between the cylinder 44 and the latch member 47 and urges it toward the extended or phantom position. The forward end of the latch 47 is formed with a camming surface 51 which engages the side wall of the trolley 34 as it moves to the captured position, thus moving the latch 47 to the left until the aperture 48 moves into alignment with the latch 47. At this time, the spring 49 snaps the latch 47 forward and locks the trolley 34 against outward movement of the trolley relative to the cradle 16.

The latch member 47 is formed with a piston head 52 extending into sealing engagement with the inner wall of the cylinder 44. When fluid under pressure is admitted to the inner end of the cylinder 44 through a pressure line 53 (FIG. 7), it acts on the piston head 52 to overcome the spring 49 and release the trolley 34 by withdrawing the latching element 47. Thus the latching mechanism automatically functions to lock the trolley 34 in the captured position of FIGURE 3, but can be released by fluid pressure when the trolley is to be released for movement to the opposite vessel.

Figure 5A:
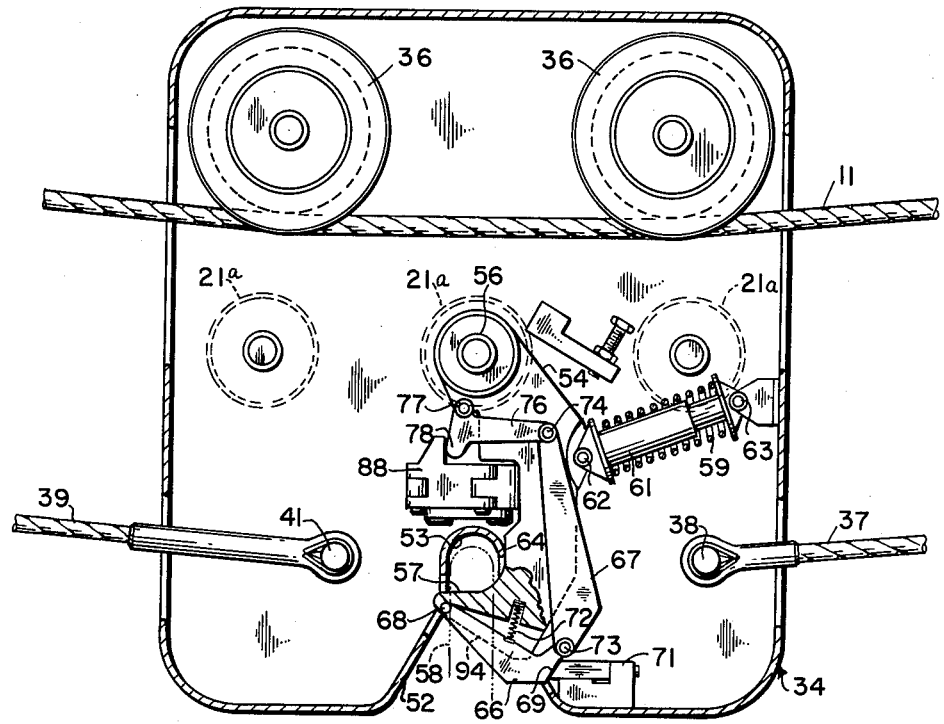
FIGURE 5a is an enlarged view of the trolley structure showing the elements in the load supporting position.
Figure 5B:
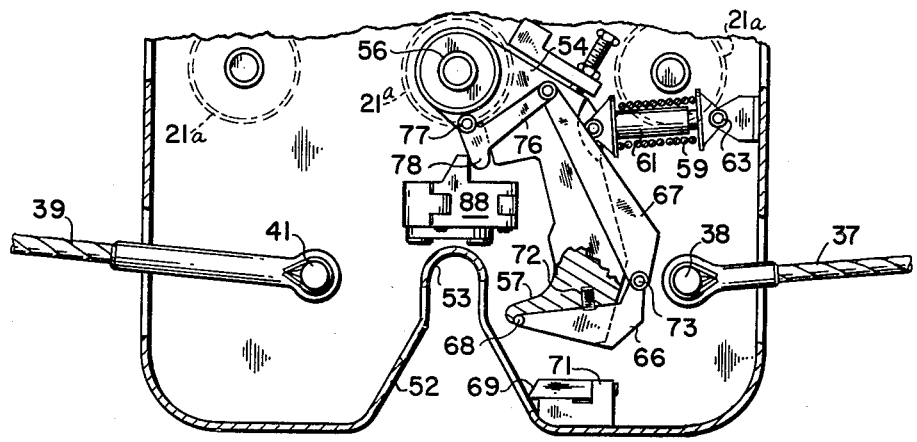
FIGURE 5b is a fragmentary view showing the elements in the open or load released position.
Figure 6:
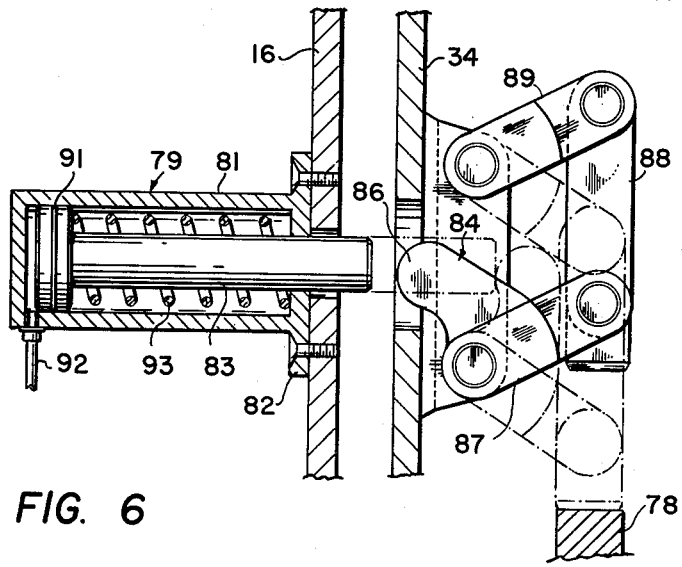
FIGURE 6 is a fragmentary view of the hook actuating mechanism used to release the load at the end of the transfer operation.

Reference should now be made to FIGURES 5a, 5b and 6 for a detailed understanding of the latching mechanism used to secure the load to the trolley. The lower side of the trolley 34 is formed with a recess 52 having a relatively wide throat narrowing to an upper end at 53. A hook member 54 is pivoted on the trolley by a pivot pin 56. The lower end of the hook member 54 is formed with a hook projection 57 which extends across the throat 53 to secure the shackle 58 of the load when the hook member 54 is in the full line position of FIGURE 5a. A spring 59 is positioned around a telescoping guide one end of which is pivoted to the hook member 54 at 62 and the other end of which is pivoted to the trolley 34 at 63. The spring 59 thus urges the hook member 54 toward the full line closed position in engagement with a stop 64 on the trolley 34.

A locking link 66 operates to lock the hook in the closed position during the travel along the high-line 11 to prevent accidental release of the load. The locking link 66 is pivoted at 68 on the forward end of the hook portion 57 and is provided with a stop surface 69 engageable with a stop 71 on the trolley frame. The interengagement between the stop surface 69 and the stop 71 prevents the hook member 54 from moving away from the lock position to prevent accidental release of the load. A spring 72 extends between the hook member 54 and the locking link 66 and urges it toward the latched position. One end of a connecting link 67 is pivoted at 73 on the locking link 66 and at its other end is pivoted at 74 on a latch operator 76. The latch operator 76 is in turn pivoted at 77 on the hook member 54 and is provided with a boss 78 engageable by the hook releasing mechanism when the hook 54 is to be moved to the released position.

Movement of the boss 78 to the right, as viewed in FIGURE 5a, causes the latch operator 76 to rotate in a counterclockwise direction around the pivot 77. This causes the connecting link 67 to move the locking link 66 in a counterclockwise direction against the action of the spring 72 until the stop surface 69 is clear of the stop 71. At this time the locking link 66 bottoms against the hook member 54, and continued movement of the boss 78 to the right causes counterclockwise rotation of the entire hook member and its assembly against the action of the spring 59 until the hook portion 57 is clear of the throat 53. Thus, movement of the boss 78 to the right operates to unlatch or unlock the hook member 54 and move it to the open or clear position to release the load by permitting the shackle 58 to move downwardly.

The mechanism for moving the boss 78 to release the hook is illustrated in FIGURE 6. This mechanism includes a hydraulic actuator 79 including a cylinder 81 provided with a flange 82 bolted to the cradle 16 and a piston 83 movable between a retracted position shown in full line in FIGURE 6 and a forward position shown in phantom. The piston 83 extends through an aperture in the frame of the cradle 16 and is positioned adjacent to a rocker arm 84 when the trolley 34 is in its captured position. The rocker arm 84 is pivoted on the trolley 34 and is formed with an arm 86 positioned opposite the piston 83. Extension of the piston 83 causes engagement between the arm 86 and the inner end of the piston 83 and, as a result, rotation of the rocker arm 84 to the phantom line position.

A second arm 87 is formed on the rocker arm 84 and is pivotally connected to a connecting link 88. The connecting link 88 is in turn pivoted to an idler link 89 which cooperates with the rocker arm 84 to form a parallelogram linkage. The end of the connecting link 88 is proportioned to engage the boss 78 of the latch operator 66 when the rocker arm 64 is rotated in a clockwise direction (as viewed in FIGURE 6). This movement causes the boss 78 to rotate the latch operator 76 to release the hook member 54 and move it to the open position. Thus, the actuator 79, which is mounted on the cradle, causes the hook member 54 to be released when it is pressurized for extension. The piston 83 is provided with a piston head 91 which extends into sealing engagement with the inner wall of the cylinder 81 so when fluid under pressure is admitted through a pressure line 92, the piston 83 is extended to release the hook member 54. A spring 93 positioned between the inner end of the cylinder 81 and the piston head 91 normally maintains the piston in the retracted or full line position spaced from the trolley 34.

Referring again to FIGURE 5a, a load can be connected to the trolley 34 by merely raising the bar or shackle 58 of the load into the throat 53. During this movement the locking link 66 is first engaged and moved to the unlocked position. The lower side of the hook portion 57 is then engaged by the shackle. This lower side 94 of the hook portion is formed as an inclined camming surface so that upward movement of the shackle 58 cams the hook open against the action of the spring 59. As soon as the shackle 58 is properly positioned in the throat, the spring 59 and the spring 72 relocks the hook assembly, thus securing the shackle in its proper position. Because of the structure the actuator 79 does not have to be operated during the insertion or connection of the load to the trolley, but must be operated only to release the load. In effect the hook mechanism is therefore automatic in its coupling functions.

The spring and damper unit 28 used to cushion the movement of the trolley 34 as it approaches the captured position is illustrated in FIGURE 8. The cylinder 29 is formed with two axially extending bores 116 and 117. The piston 32 telescopes into the bore 116 and forms in cooperation therewith a variable volume liquid filled chamber 118. When the piston 32 moves into the bore 116, the volume of the chamber 118 is reduced by an amount equal to the increased displacement of the rod portion 119 of the piston 32. This results in displacement of the liquid into the forward end of the bore 117 through a passage 121. A floating piston 122 is positioned in the bore 117 to divide it into a compressed air filled rearward chamber 123 and a liquid filled forward chamber 124. The compressed air operates to pressurize the liquid in the chambers 124 and 118 and thereby resiliently urge the piston toward the extended position.

To provide the required damping, the cylinder is formed with an axial passage 124 and a plurality of connecting orifices 126 to 131. These cooperate with a piston head 132 to produce a variable damping rate which operates to decelerate the trolley in the required manner. When the piston starts to move toward the compressed position, liquid is displaced through all the orifices 126 to 131 and through a tapered slot 133. However, as the piston head 132 approaches the rearward end of the bore 116, the slot 133 and the orifices 127 to 131 are progressively passed to increase the resistance to liquid flow and thereby increase the damping rate. The positions of the orifices and their size are arranged to snub or decelerate the trolley and its supported load in a predetermined manner, thus preventing damage to the apparatus or transferred load.

In order to raise a load to the trolley 34 or to remove the load from the trolley and lower it to the deck, an elevator (best illustrated in FIGURES 1, 2 and 3) is used. The elevator includes a bearing ring 96 vertically movable along the mast 10. The mast 10 is provided with a keyway 97 and the bearing ring 96 is provided with a key to prevent relative rotation while permitting vertical movement of the bearing ring. A pair of lifting cables 98 connect at their ends on the bearing ring and extend up through the mast 10 and over pulleys 99. The cables 98 are connected at their other ends to a winch, not shown, which operates through the cables to either raise or lower the bearing ring along the mast 10. The elevator frame 101 is mounted for rotation on the bearing ring 96 and is axially fixed relative thereto. Thus, when the bearing ring 96 is raised by the lifting cables the elevator frame 101 is also raised along the mast.

A hydraulic actuator 102 is connected between the bearing ring 96 and the elevator frame 101 to produce a controlled rotation therebetween. To properly orient the elevator frame 101 relative to the receiving head assembly 12, a vertical arm 103 extends up from the elevator frame 101 and is adapted to be engaged within a vertical groove 104 on the rearward side of the receiving head, as shown in FIGS. 3 and 4. The vertical arm 103 is preferably pivoted for radial movement relative to the mast and is suitably spring loaded toward the vertical position. As the elevator frame 101 is raised to a position immediately below the receiving head assembly 12, the vertical arm 103 is cammed outwardly by the flange 106. Unless both the elevator frame 101 and the receiving head assembly are properly aligned, the operator merely operates the hydraulic actuator 102 to move the vertical arm along the flange until it drops into the vertical groove 104. When this occurs, the elevator frame 101 is properly oriented relative to the receiving head assembly 12 and is locked against rotation relative thereto. If the receiving head 12 is rotated about the vertical axis 14 by the high-line 11, the vertical arm 103 through its engagement with the walls of the groove 104 rotates the elevator frame 101 to maintain the proper position. The hydraulic control circuit for the actuator 102 should therefore be provided with bypass ports to permit the rotation of the elevator frame 101 by the receiving head assembly 12.

Figure 2:
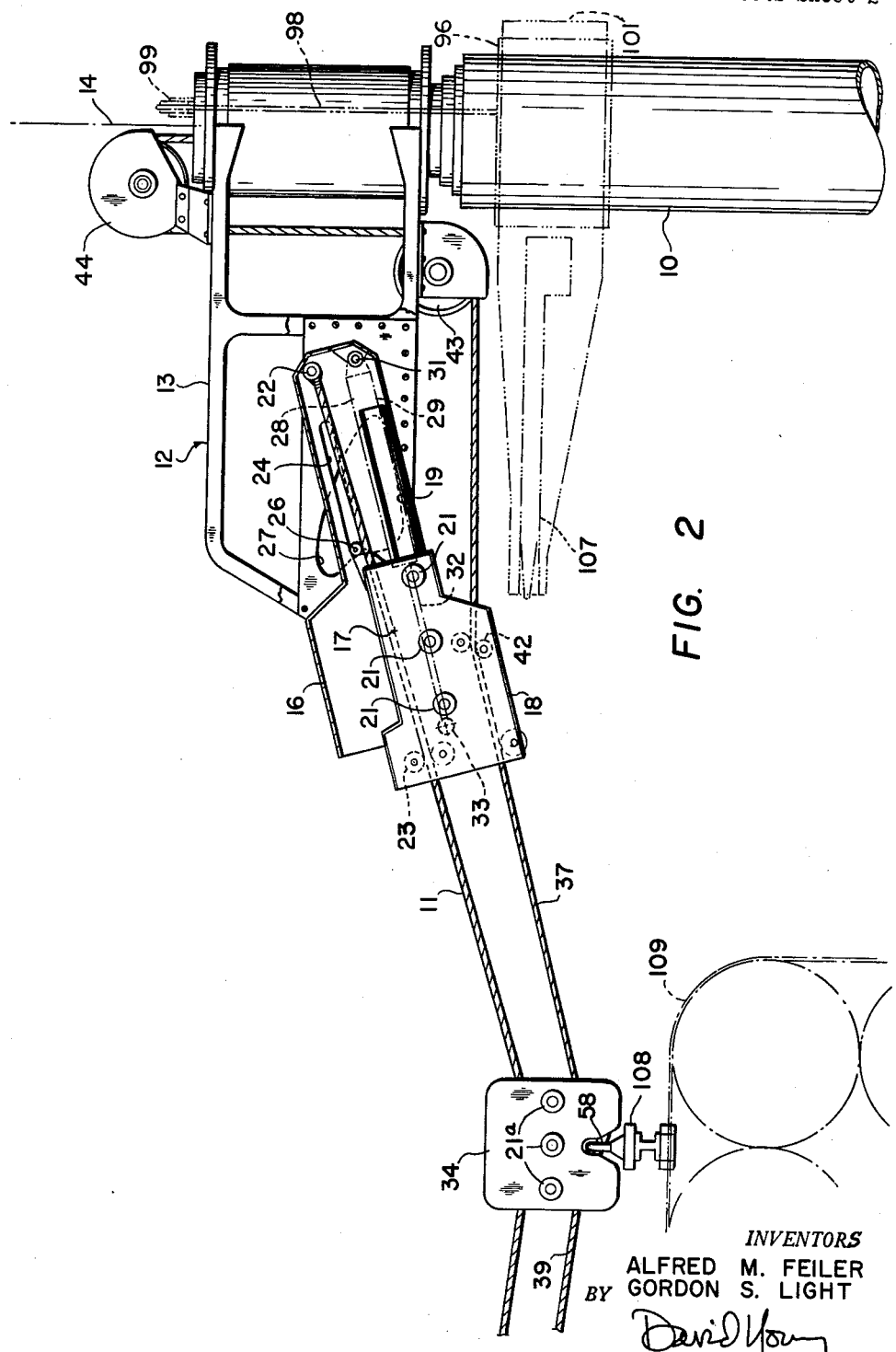
FIGURE 2 is a side elevation of the receiving head with the carriage extended and the trolley approaching the carriage.

Referring now to FIGURE 2, a pair of fork elements 107 are mounted on the elevator frame 101 for movement between a retracted position of FIGURE 2 and an extended position of FIGURE 3. A suitable hydraulic actuation system (not shown) is used to extend and retract the fork elements. When the fork elements 107 are in the retracted position of FIGURE 2, they are clear of the trolley 34 and the load. However, once the trolley moves into its captured position of FIGURE 3, the forks 107 can be extended to engage the bar 108 supporting the load shown in phantom at 109. Since the trolley and in turn the load supported thereon is in a predetermined position relative to the receiving head 13 when the trolley is captured at the end of its travel and since the elevator is maintained in a predetermined position relative to the receiving head 13 by the vertical arm 103, extension of the fork elements 107 will properly engage the bar 108. Therefore, the forks will properly engage the bar for removal of the load from the trolley at the end of its transfer. Conversely, when the elevator is used to raise a load 109 so that it can be secured in the trolley, the proper positioning of the load and of the shackle 58 on the trolley 34 is insured because of the predetermined positioning of the various elements.

Figure 9A:
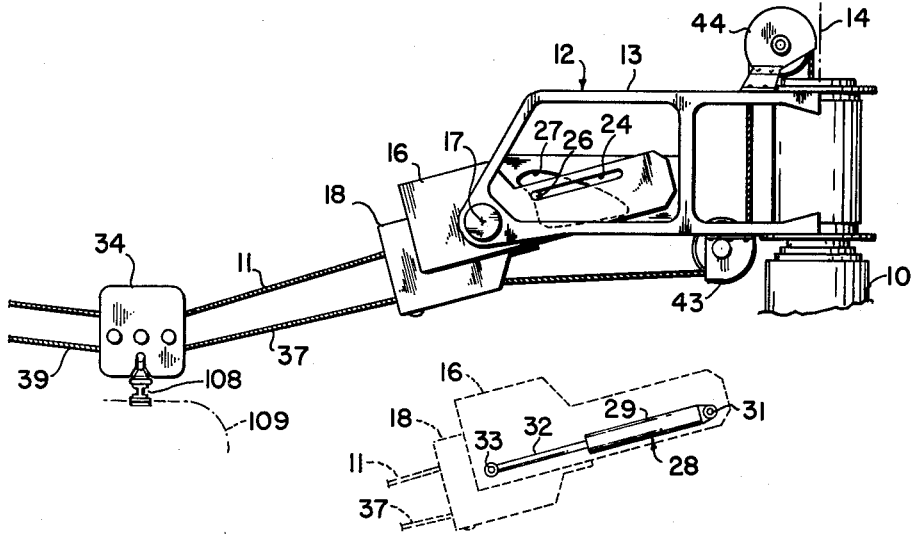

In operation the transfer mechanism is first rigged with the high-line 11 extending between the masts on the two ships. This is done by conventional means known to those skilled in the art. Once the rigging is completed, a load 109 is picked up by the forks 107 of the elevator on the supply ship. The load is then raised and through the snap action of the hook connected to the trolley 34. The forks 107 are then retracted clear of the bar 108 and the latch mechanism illustrated in FIGURE 7 is pressurized to release the trolley permitting it to move out along the high-line 11 under the influence of the outhaul line 39. When the trolley approaches the end of its travel along the high-line, the cradle 16 is oriented in a direction aligned with the high-line 11 and the carriage 18 is in the extended position (see FIGURE 9a). The receiving head assembly 12 is properly positioned around the vertical axis 14 of the mast 10 due to the action of the high-line 11. Therefore, the trolley approaches the receiving head assembly squarely regardless of the relative movement between the two vessels.

Figure 9B:
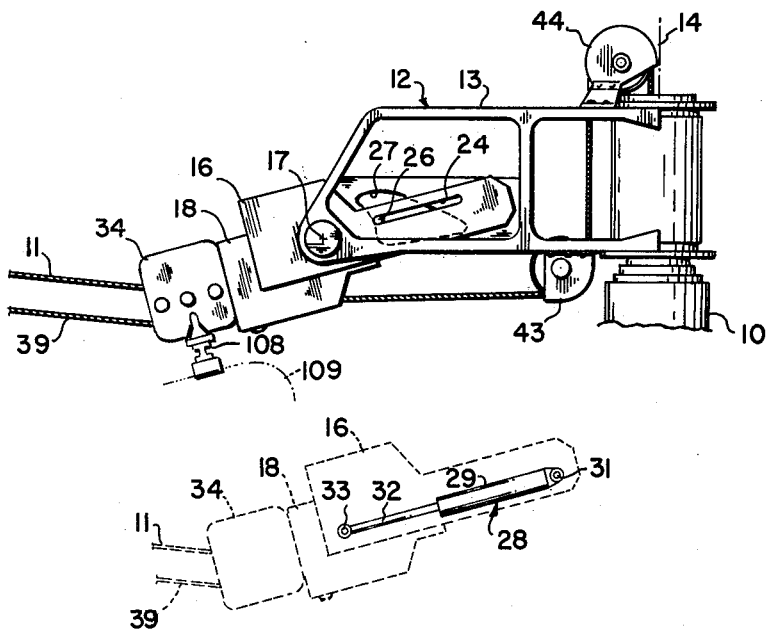

When the trolley engages the end of the carriage as illustrated in FIGURE 9b, the shock absorber 28 is extended so that movement of the trolley to the captured position causes compression of the shock absorber 28 and deceleration of the trolley 34. It also causes movement of the carriage toward the retracted position until the pin 26 engages the cam 27 as illustrated in FIGURE 9c. Continued movement of the trolley toward the captured position of FIGURE 9d through the action of the pin 26 moving along the cam 27 causes the carriage to be rotated around its pivot axis 17 to the horizontal position. The rollers 21a also move into the track 19 on the cradle 16 so that the trolley 34 is supported on the cradle and the cradle is locked into a predetermined position relative to the receiving head 13. The latch mechanism 47 of FIGURE 7 engages the trolley and securely locks it in the captured position at this time.

Prior to the arrival of the trolley in the captured position, the receiving ship elevator is raised and locked into position relative to the receiving head assembly 12 with the forks 107 in the retracted position. As soon as the trolley is captured, the forks 107 are extended to secure the load by engaging the strong back 108. The hook member 54 of the trolley is then released by the load releasing mechanism illustrated in FIGURE 6 so that the elevator can be lowered removing the load from the receiving head assembly. The elevator is used to position the load on any suitable ship board handling device. While the load is being lowered by the elevator of the receiving ship, the inhaul line returns the trolley to the supply ship where an additional load is waiting. The above described operation is repeated until the necessary stores are transferred. Although the description above referred to to transfer of loads in only one direction, it is obvious that the system can be used for transfer in both directions. Those skilled in the art will recognize that because the load is positively positioned when it reaches the end of the travel along the highline, it can be easily engaged by the elevator for lowering to the ships deck. Thus, complete control by power operated equipment is provided during the entire transfer operation. Because the receiving head is aligned with the high-line regardless of the relative movement between the vessels, the trolley moves smoothly into the captured position. The use of a shock absorber also prevents the occurrence of damaging decelerations so fragile loads can be safely transferred by this system.

Although a preferred embodiment of the invention has been shown and described in detail, it is understood that the invention is not limited to the structures shown, and that various modifications and rearrangements may be made by those skilled in the art without departing from the scope of the invention as defined in the following claims.

What is claimed is:

1. A high-line transfer system comprising a receiving head assembly, a high-line supported by said assembly, a trolley movable along said high-line into a captured position within said receiving head assembly, and damping means on said receiving head assembly engaging said trolley as it approaches said captured position reducing the velocity of said trolley as it moves to said captured position.

2. A high-line transfer system comprising a receiving head assembly, a carriage mounted on said assembly for movement between an extended and a retracted position, damping means connected to said carriage urging said carriage toward said extended position and resisting movement thereof to said retracted position, a high-line supported by said receiving head assembly, a trolley movable along said high-line into a captured position within said receiving head assembly, said trolley engaging said carriage as it approaches said captured position whereby its velocity is reduced as it moves to said captured position.

3. A high-line transfer system comprising a receiving head assembly, a high-line supported by said receiving head assembly, a trolley movable along said high-line to a captured position in said receiving head assembly, a load connector on said trolley movable from a closed position in which a load can be supported and an open position for releasing a load, and power means on said receiving head assembly operable when the trolley is in said captured position to move said load connector to said open position.

4. A high-line transfer system comprising a receiving head assembly, a high-line supported by said receiving head assembly, a trolley movable along said high-line to a captured position in said receiving head assembly, a load connector on said trolley movable from a closed position in which a load can be supported and an open position for releasing a load, an operator arm on said trolley connected to move said load connector to said open position, and power means on said receiving head assembly having a plunger engageable with said operator arm when the trolley is in said captured position to move said operator arm and in turn move said load connector to said open position.

5. A high-line transfer system comprising a frame, a receiving head mounted on the frame for rotation about a vertical axis, a cradle supported by said frame for pivotal movement relative thereto about a horizontal axis, a carriage movably supported by the cradle, a high-line extending through said cradle and the carriage and normally maintaining said cradle aligned with said high-line, a trolley movable along said high-line, first means on said cradle supporting said trolley in a predetermined captured position relative to said cradle when said trolley moves to the end of its travel along said high-line, and second means on the receiving head and on the cradle and on the carriage operable to move said cradle to a predetermined position relative to said horizontal axis under the influence of movement of said trolley to said captured position.

6. A high-line transfer system comprising a frame, a receiving head mounted on the frame for rotation about a vertical axis, a cradle supported by said frame for pivotal movement relative thereto about a horizontal axis, a carriage movably supported by the cradle, a high-line extending through said cradle and the carriage and normally maintaining said cradle aligned with said high line, a trolley movable along said high-line, a track on said cradle engaged by and supporting said trolley in a predetermined captured position relative to said cradle when said trolley moves to the end of its travel along said high-line, second means on the receiving head and on the cradle and on the carriage operable to move said cradle to a predetermined position relative to said horizontal axis under the influence of movement of said trolley to said captured position, an elevator on said frame vertically movable to a position adjacent to said cradle and rotatable about said vertical axis, and a lock mechanism maintaining said cradle and elevator in a predetermined orientation relative to each other about said vertical axis only when said elevator is adjacent to said cradle.

7. A high-line transfer system comprising a frame, a receiving head mounted on said frame for rotation about a vertical axis, a cradle mounted on said receiving head for pivotal movement relative thereto about a horizontal axis, a carriage movably supported by the cradle, a high-line extending through said cradle and the carriage and normally maintaining said cradle aligned with said-high-line, a trolley movable along said high-line, first means on said cradle supporting said trolley in a predetermined captured position relative to said cradle when said trolley moves to the end of its travel along said high-line, and second means on the receiving head and on the cradle and on the carriage operable to move said cradle to a predetermined position relative to said horizontal axis under the influence of movement of said trolley to said captured position.

8. A high-line transfer system comprising a frame, a receiving head mounted on said frame for rotation about a vertical axis, a cradle mounted on said receiving head for pivotal movement relative thereto about a horizontal axis, a carriage movably supported by the cradle, a high-line extending through said cradle and the carriage and normally maintaining said cradle and the carriage aligned with said high-line, a trolley movable along said high-line, first means on said cradle supporting said trolley in a predetermined captured position relative to said cradle when said trolley moves to the end of its travel along said high-line, and second means on the receiving head and on the cradle and on the carriage operable to move said cradle to a predetermined position relative to said horizontal axis under the influence of movement of said trolley to said captured position, an elevator on said frame vertically movable to a position adjacent to said cradle and rotatable about said vertical axis, and a lock mechanism maintaining said cradle and elevator in a predetermined orientation relative to each other about said vertical axis only when said elevator is adjacent to said cradle.

9. A high-line transfer system comprising a frame, a receiving head assembly mounted on said frame for pivotal movement about a vertical axis, a high-line supported from said receiving head assembly in such a manner as to enable pivoting of the high-line about a horizontal axis, a trolley movable along said high-line into said receiving head assembly, means on said receiving head assembly operable under the influence of movement of said trolley into said receiving head assembly guiding said trolley to a predetermined captured position, and elevator means movable on said frame operable to transport a load to said trolley while said trolley is in said captured position.

10. A high-line transfer system comprising a frame, a receiving head assembly mounted on said frame for pivotal movement about a vertical axis, a high-line supported from said receiving head assembly in such a manner as to enable pivoting of the high-line about a horizontal axis, a trolley movable along said high line into said receiving head assembly, means on said receiving head assembly operable under the influence of movement of said trolley into said receiving head assembly positioning said trolley in a predetermined horizontal position, and elevator means movable on said frame operable to transport a load to said trolley while said trolley is in said predetermined position.

11. A high-line transfer system comprising a frame, a receiving head mounted on the frame for rotation about a vertical axis, a cradle mounted on said receiving head for pivoting motion relative thereto about a horizontal axis, a high-line supported at one end on said cradle, a carriage mounted on said cradle for linear motion relative thereto between an extended and retracted position, cam means on the receiving head and on the carriage operable under the influence of movement of said carriage to said retracted position to move said carriage and cradle to a predetermined horizontal position relative to said frame, and a load supporting trolley supported by and movable along said high-line into engagement with said carriage, said trolley operating to move said carriage to said retracted position by virtue of movement of said trolley to a captured position.

12. A high-line transfer system comprising a frame, a receiving head mounted on the frame for rotation about a vertical axis, a cradle mounted on said frame for pivoting motion relative thereto about a horizontal axis, a high-line supported at one end on said cradle, a carriage mounted on said cradle for linear motion relative thereto between an extended and retracted position, spring and damping means connected between said cradle and carriage resiliently urging said carriage toward said extended position and resisting relative movement therebetween toward said retracted position, cam means on the receiving head and on the carriage operable under the influence of movement of said carriage to said retracted position to move said carriage and cradle to a predetermined horizontal position relative to said frame, a load supporting trolley supported by and movable along said high-line into engagement with said carriage, said trolley operating to move said carriage to said retracted position by virtue of movement of said trolley to a captured position, and means cooperating between said trolley and cradle releasably securing said trolley in said captured position.

13. A high-line transfer system comprising a frame, a receiving head mounted on the frame for rotation about a vertical axis, a cradle mounted on said receiving head for pivoting motion relative thereto about a horizontal axis, a high-line supported at one end on said cradle, a carriage mounted on said cradle for linear motion relative thereto between an extended and retracted position, spring and damping means connected between said cradle and carriage resiliently urging said carriage toward said extended position and resisting relative movement therebetween toward said retracted position, cam means on the receiving head and on the carriage operable under the influence of movement of said carriage to said retracted position to move said carriage and cradle to a predetermined horizontal position relative to said frame, a trolley supported by and movable along said high-line into engagement with said carriage, a load latch on said trolley operable to releasably secure a load to said trolley, said trolley operating to move said carriage to said retracted position by virtue of movement of said trolley to a captured position, first means cooperating between said trolley and cradle releasably securing said trolley in said captured position, and second means on said cradle operable to release said load latch when said cradle is in said captured position.

14. A high-line transfer system comprising a vertically extending mast, a receiving head pivoted on the upper end of said mast for rotation relative thereto about a vertical axis, a cradle mounted on said receiving head for rotation about a horizontal axis, a guide on said cradle, a carriage linearly movable along said guide between an extended position and a retracted position, cam means on said carriage and receiving head operable under the influence of movement of said carriage to said retracted position to rotate said cradle about said horizontal axis to a predetermined position, a high-line extending through said carriage operable to rotate said receiving head about said vertical axis and said cradle about said horizontal axis maintaining said carriage in positions wherein the direction of said linear motion is aligned with said high-line when said carriage is spaced from said retracted position, a load supporting trolley movable along said high-line to a captured position, means on said trolley supporting said trolley on said guide when said trolley is in said captured position, said trolley engaging said carriage and moving said carriage to said retracted position under the influence of movement of said trolley to said captured position.

15. A high-line transfer system comprising a vertically extending mast, a receiving head pivoted on the upper end of said mast for rotation relative thereto about a vertical axis, a cradle mounted on said receiving head for rotation about a horizontal axis, a track on said cradle, a carriage linearly movable along said track between an extended position and a retracted position, cam means on said carriage and receiving head operable under the influence of movement of said carriage to said retracted position to rotate said cradle about said horizontal axis to a predetermined position, a high-line extending through said carriage operable to rotate said receiving head about said vertical axis and said cradle about said horizontal axis maintaining said carriage in positions wherein the direction of said linear motion is aligned with said high-line when said carriage is spaced from said retracted position, a load supporting trolley movable along said high-line to a captured position, means on said trolley supporting said trolley on said track when said trolley is in said captured position, said trolley engaging said carriage and moving said carriage to said retracted position under the influence of movement of said trolley to said captured position, an elevator vertically movable on said mast and rotatable about said vertical axis, and means on said elevator and receiving head maintaining said elevator and receiving head in a predetermined orientation about said vertical axis when said elevator is adjacent to said receiving head, said elevator being operable to transport loads to and from said trolley.

16. A high-line transfer system comprising a vertically extending mast, a receiving head pivoted on the upper end of said mast for rotation relative thereto about a vertical axis, a cradle mounted on said receiving head for rotation about a horizontal axis, a track on said cradle, a carriage linearly movable along said track between an extended position and a retracted position, a damper connected to resist movement of said carriage to said retracted position, cam mean on said carriage and receiving head operable under the influence of movement of said carriage to said retracted position to rotate said cradle about said horizontal axis to a predetermined position, a high-line extending through said carriage operable to rotate said receiving head about said vertical axis and said cradle about said horizontal axis maintaining said carriage in positions wherein the direction of said linear motion is aligned with said high-line when said carriage is spaced from said retracted position, a load supporting trolley movable along said high-line to a captured position, means on said trolley supporting said trolley on said track when said trolley is in said captured position, said trolley engaging said carriage and moving said carriage to said retracted position under the influence of movement of said trolley to said captured position, an elevator vertically movable on said mast and rotatable about said vertical axis, and means on said elevator and receiving head maintaining said elevator and receiving head in a predetermined orientation about said vertical axis when said elevator is adjacent to said receiving head, said elevator being operable to transport loads to and from said trolley.

No references cited.